(12) United States Patent
Bailey

(10) Patent No.: US 6,561,043 B1
(45) Date of Patent: May 13, 2003

(54) OIL WELL FLOW METER WITH CIRCUMFERENTIALLY EXTENDING POCKET

(75) Inventor: Lloyd S Bailey, Nailsea (GB)

(73) Assignee: ABB Offshore Systems Limited, Bristol (GB)

(*) Notice: Subject to any disclaimer, the term of this patent is extended or adjusted under 35 U.S.C. 154(b) by 0 days.

(21) Appl. No.: 09/700,344

(22) PCT Filed: Apr. 26, 1999

(86) PCT No.: PCT/GB99/01280

§ 371 (c)(1),
(2), (4) Date: Feb. 3, 2001

(87) PCT Pub. No.: WO99/60344

PCT Pub. Date: Nov. 25, 1999

(30) Foreign Application Priority Data

May 19, 1998 (GB) .............................................. 9810590

(51) Int. Cl.[7] .................................................. G01F 1/37
(52) U.S. Cl. .................................. 73/861.52; 73/861.63
(58) Field of Search ........................ 73/861.42, 861.53, 73/861.52, 861.63, 861.64

(56) References Cited

U.S. PATENT DOCUMENTS

| | | | | |
|---|---|---|---|---|
| 2,573,430 A | | 10/1951 | Gentile | |
| 3,680,376 A | * | 8/1972 | Catheron | 73/861.61 |
| 3,736,797 A | | 6/1973 | Brown | |
| 4,130,017 A | * | 12/1978 | Benedict et al. | 73/861.61 |
| 4,249,164 A | | 2/1981 | Tivy | |
| 5,038,621 A | | 8/1991 | Stupecky | |
| 5,979,247 A | * | 11/1999 | Kizawa | 73/861.53 |

FOREIGN PATENT DOCUMENTS

EP 0 409 779 A2 1/1991

* cited by examiner

*Primary Examiner*—Harshad Patel
(74) *Attorney, Agent, or Firm*—Kirschstein, et al.

(57) ABSTRACT

A flow meter for use in an oil well has a central bore region in which an annular tube is fixed co-axially with the central bore region by a ring, which also seals the gap between the inner bore of the central bore region and the tube at its downstream end, thus forming a pocket open to the direction of fluid flow through the central bore region. The pocket brings the fluid to rest, thereby converting all of the dynamic pressure of the fluid into static pressure. This has the effect of maximizing the pressure differential obtainable between the central bore region and a position upstream of the tube, which allows an electronic calculation to be made to provide a more accurate flow rate measurement than would have been possible without the pocket.

11 Claims, 2 Drawing Sheets

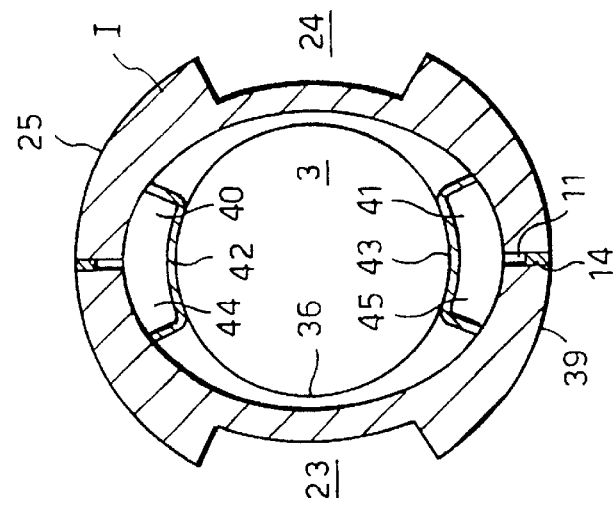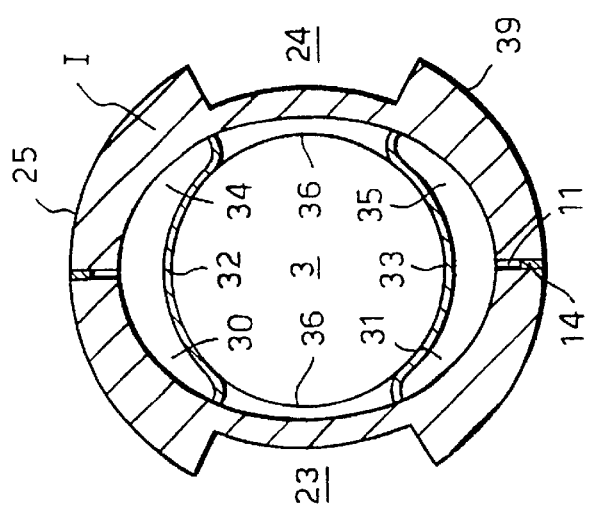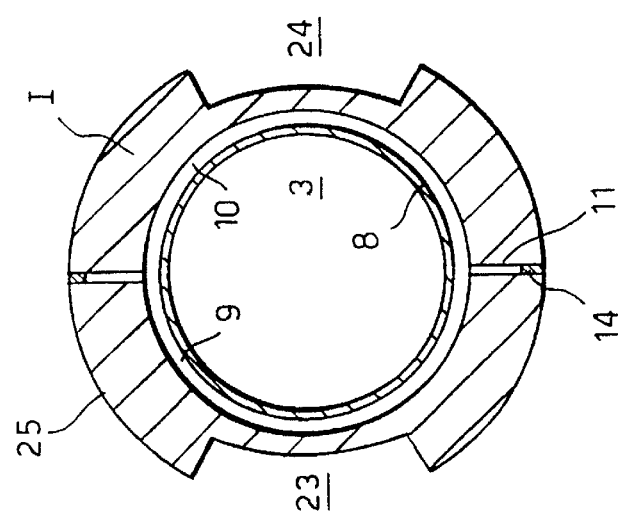

OIL WELL FLOW METER WITH CIRCUMFERENTIALLY EXTENDING POCKET

BACKGROUND OF THE INVENTION

The present invention relates to a flow meter for indicating fluid flow. It is particularly, but not exclusively, related to indicating or measuring the flow of oil and water mixtures in production tubing of a well.

A well used to extract hydrocarbons from an underground reservoir typically comprises a borehole drilled down to the underground reservoir and lined with a steel casing. The casing is inserted into the borehole and cemented into place. Production tubing, which is used to convey hydrocarbons from the reservoir to an upper region, or mouth, of the borehole, extends from the mouth of the borehole to the reservoir. The reservoir is typically located near to the bottom of the borehole. An elongate annular space thus defined between the casing and the tubing, referred to as the annulus, is usually sealed at points along its length by devices known as packers.

In operation of the well, hydrocarbons enter the production tubing either through its open lower end or through a choke device located at a position along its length between two packers. It has been proposed to make measurements of hydrocarbons' flow rate, temperature and pressure in the borehole and use the measurements to control the choke devices.

Since hydrocarbons may enter the production tubing at different locations the need arises to measure hydrocarbons' flow rate with a flow meter at different locations within the production tubing. A problem found with certain conventional flow meters is that they reduce the effective diameter of the bore of the production tubing and must be removed to allow the passage of tools to upstream tubing. The term effective diameter here means the smallest unobstructed diameter and can be hypothetically equated to the largest diameter circular tube which could be passed lengthwise through the insert I without obstruction. Removal of such flow meters is costly, time consuming and risky. Another problem is that at low flow rates, certain conventional flow meters can give less accurate or lower resolution measurements than is desired.

SUMMARY OF THE INVENTION

In accordance with the present invention there is provided a flow meter for indicating fluid flow in a duct, comprising a pocket open at its upstream end in the duct, detection means for detecting a pressure differential between a first position inside the pocket and a second position outside the pocket and means for deriving from the pressure differential an indication of the fluid flow within the duct.

At low flow rates, a flow meter according to the invention can provide more accurate or higher resolution flow indication or measurement using the same or even inferior accuracy pressure transducers than has been possible hitherto. An advantage of the invention is that it need not reduce the effective diameter of a duct in which it is installed.

The duct may be a conduit, a pipe or some other fluid path.

The pocket may be closed at its downstream end. Alternatively it may be open at its downstream end and be provided by at least one hole through which fluid is able to flow.

The pocket may extend continuously around the internal perimeter of the flow meter. Advantageously, this provides a relatively simple configuration. Alternatively the pocket extends around a segment of the internal perimeter of the flow meter. Such a configuration may be of particular use if the dimensions of the insert are limited by an external factor.

The flow meter comprises a central bore region. This may have a bore having a non-circular cross-section. Preferably it is oval. Use of such a cross-section enables the cross-sectional area of the bore of the central bore region to be increased relative to that available if a bore having a circular cross-section is used. In this event the effective diameter may be limited by features on the outside surface of the insert. A non-circular bore may be of particular advantage in boreholes where the outer dimensions of the flow meter are limited by the inner dimensions of, for example, a borehole casing.

Preferably, the segment corresponds to an apex of an oval bore. Here, the effective diameter of the bore of the flow meter may be greater than or equal to the bore of an inlet or an outlet of the flow meter for the whole of its length. This may be advantageous in providing a flow meter which permits the passage of tools and instrumentation through production tubing in which it is installed.

Preferably the flow meter has a first conduit allowing communication of pressure information from a first position in its bore to a measuring position at its outer surface.

It may also have a second conduit allowing communication of pressure information from a second position in its bore to a measuring position at its outer surface. This allows pressure measurement transducers and any associated electronics to be located outside the duct, away from the fluid flow, to increase its lifetime, reliability, or both. This is advantageous if the fluid flow provides a harsh environment. Preferably, the first conduit extends first substantially radially and then substantially longitudinally. This feature may allow the flow meter to occupy minimal space radially from the central axis of the duct. This is of particular significance where the insert is to be used within a hydrocarbon production borehole. It is also of significance in a number of narrow bore holes for other purposes.

BRIEF DESCRIPTION OF THE DRAWINGS

An embodiment of the present invention will now be described by way of example only, with reference to the accompanying drawings, in which:

FIG. 2 shows cross-section A-A of the FIG. 1 flow meter;

FIG. 3 shows a cross-section of a second embodiment of a flow meter in accordance with the present invention; and FIG. 4 shows a cross-section of a third embodiment of a flow meter in accordance with the present invention.

DETAILED DESCRIPTION OF THE PREFERRED EMBODIMENTS

Figure 1:
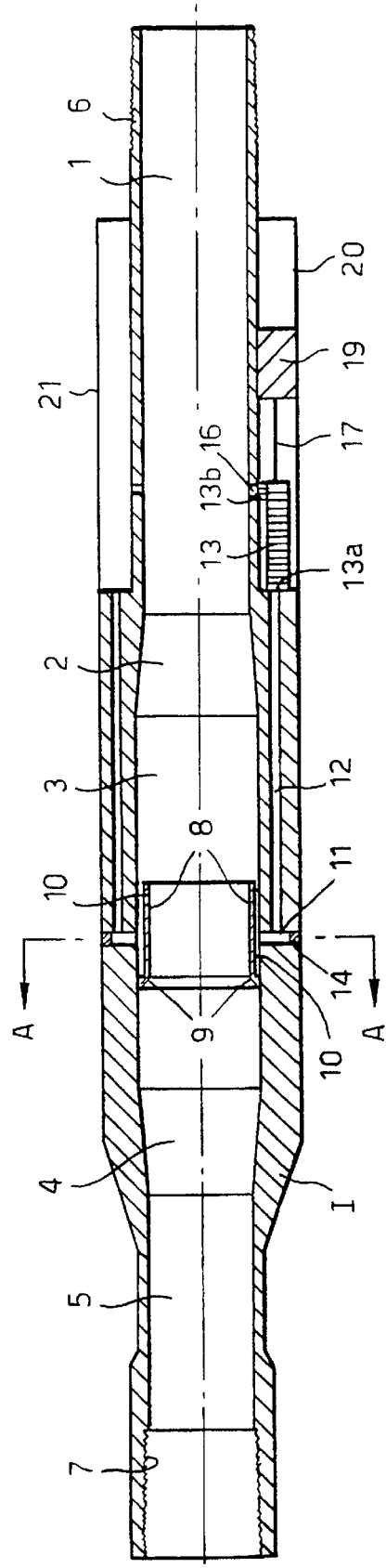
FIG. 1 shows a longitudinal cross-section of a flow meter in accordance with the present invention.

In FIG. 1, an insert I comprises the flow meter having an inlet 1, a tapering bore region 2, a central bore region 3, a tapering bore region 4 and an outlet 5. In use, fluid flows through the insert I from right to left in the Figure, the insert thus forming a duct. The insert I is formed by welding together stainless steel sections which have previously been machined. The inlet 1 includes a threaded portion 6 which is threaded into oppositely-threaded upstream production tubing (not shown). The outlet 5 similarly includes a threaded portion 7 which is threaded into oppositely-threaded downstream production tubing (not shown). The connections between the inlet 1 and the outlet 5 and the production tubing provide little or no resistance to fluid flow through the insert I and to the passage of tools, instrumentation or both through the insert I.

The inlet 1 and outlet 5 each have bores having a uniform circular cross-section. The central bore region 3 has a bore having a uniform circular cross-section which is larger than that of the inlet 1 and outlet 5. In the direction of fluid flow, the tapering bore region 2 has a bore which tapers outwards uniformly from the cross-section of the bore of the inlet 1 to the larger circular cross-section of the bore of the central bore region 3. The tapering region 4 has a bore which tapers inwards uniformly from the bore of the cross-section of the central bore region 3 to the bore of the circular cross-section of the outlet 5. Thus, the bore of the insert I does not have a cross-sectional area at any point along its length which is smaller than the cross-sectional areas of the inlet 1 and the outlet 5.

A tube section 8 of uniform circular cross-section is coaxially located in the central bore region 3. An annular space is provided between the central bore region 3 and the tube section 8. At its downstream end the tube section 8 has an outwardly extending flange or ring 9. The ring 9 is welded to the inside surface of the central bore region 3 and so closes off the annular space at its downstream end. The tube section 8, the inner surface of the central bore region 3 and the ring 9 thus form a pocket 10 which is open at its upstream end, that is, the pocket 10 faces upstream. The bore of the tube section 8 has a cross-sectional area which is equal to or slightly greater than the cross-sectional areas of those of the inlet 1 and the outlet 5. Desirably, the effective diameter of the bore of the insert I is not less than the diameter of the circular cross-section of the bore of the inlet 1 and the outlet 5.

A first conduit 11 extends radially from the pocket 10 to the outer surface of the central bore region 3. The first conduit 11 is connected at its middle to a first end of a second conduit 12. The second conduit 12 is located in the wall of the insert I and extends parallel to its longitudinal axis. A first port 13a of a differential pressure measurement transducer 13 is located at a second end of the second conduit 12. An end of the first conduit 11 located at the outer surface of the central bore region 3 is closed off with a bung 14 so as to provide a first fluid contact path 11, 12 between the pocket 10 and the transducer port 13a. A second fluid contact path 16 is provided between the bore of the inlet 1 and a second port 13b of the transducer 13. The transducer 13 is a high accuracy quartz sensor. Alternatively it may be a strain gauge measurement transducer. The transducer 13 is connected to an electronic calculating means 19 by a twisted pair 17. The calculating means 19 is attached to the outside of the inlet 1. The transducer 13 and the calculating means 19 are protected by a protective cover 20. The arrangement of features 11 to 20 described above is referred to as the first flow measuring arrangement.

There is a second, similar, flow measuring arrangement provided on the opposite side of the inlet 1. It has a differential pressure measurement transducer configured to measure pressure inside the pocket 10 and in the bore of the inlet 1, and an electronic calculating means. It is protected by a protective cover 21. This second flow measuring arrangement is redundant and is to be used in the event of failure of the first flow measuring arrangement, Such redundancy is useful in borehole applications, because replacement of a flow meter may require production tubing to be removed from a well. This is a costly and time consuming procedure.

The open end or mouth of the pocket 10 is located a distance from the tapering bore region 2 at which flow is expected to be fully developed under all expected flow conditions. This occurs when the velocity profile of the fluid does not change along the direction of flow. Fully developed flow does not require an absence of turbulence. The distance provided between the open end of the pocket 10 and the junction between the central bore region 3 and the tapering bore region 2 depends on the nature of the fluid, the maximum expected fluid flow rate, the cross-sectional area of the bore of the inlet 1, the cross-sectional area of the bore of the central bore region 3, the length of the tapering bore region 2, and the accuracy of flow measurement required.

The open end of the pocket 10 should also be a sufficient distance away from the junction of the central bore region 3 and the tapering bore region 2 so that changes in the flow caused by the tube section 8 and the pocket 10 do not significantly change the static pressure extant in the inlet 1, particularly adjacent the second fluid path 16.

By locating the open end of pocket 10 where fully developed flow occurs under typical flow conditions, the transducer 13 measures a substantially constant differential pressure for a constant flow rate.

Fluid which enters the pocket 10 cannot pass through it and so is brought to rest. This converts the dynamic pressure of such trapped fluid into static pressure within the pocket 10. This maximises the pressure differential measured by the transducer 13 for given inner dimensions of the insert 1. This enables the calculating means 19 to provide a more accurate flow rate measurement than is possible in the absence of the pocket 10. This is especially important at low flow rates and at high common mode pressures where low pressure differentials have previously given unsatisfactorily inaccurate or low resolution flow rate measurements, even when high accuracy pressure transducers are used.

The calculating means 19 comprises detection means to detect the pressure differential and means to derive from it an indication of the flow rate of fluid through the insert I. This is achieved by applying Bernoulli's equation to the detected pressure differential, the density of the fluid and the known internal dimensions of the bore the insert. From this indication of flow rate, a measurement of fluid flow in the duct is obtained. This measurement may be in the form of flow mass, volume or distance, and may or may not be related to time. The fluid flow measurement may for example be total mass of fluid which has flowed past the flow meter since it started to take measurements.

Referring now to FIG. 2, first and second channels 23 and 24 are present in the wall of the insert I. The channels 23 and 24 extend along the extent of the insert I comprising the tapering bore region 2, the central bore region 3 and the tapering bore region 4. The channels 23 and 24 allow service lines, such as hydraulic power lines, electrical power conductors or electrical communication conductors and the like, to by-pass the insert I when it is installed in a well. In a typical well, the inner diameter of the casing is slightly larger than the outer diameter 25 of the insert I. The presence of the channels 23, 24 limits the diameter of the bore of the central bore region 3. The thickness of the walls of the insert I between the floor of the channels 23, 24 and the bore of the central bore region 3 must be sufficiently large so as not to compromise the strength of the insert I. Since the diameter of the bore of the tube section 8 is not less than the diameter of the bore of the inlet 1 and the outlet 5, the maximum distance between the tube section 8 and the inner surface of the central bore region 3 is more or less predetermined by the sizes of the casing and production tubing which are used.

As the fluid flow rate decreases across the cross-section of a regular duct from a maximum at its centre to zero at its walls, the pocket 10 will trap fluids travelling at speeds significantly slower than the fluids flowing along the central axis of the central bore region 3. The pocket 10 is unable to trap faster flowing fluids except by protruding further into the central bore region 3, which is undesirable as it would reduce the effective diameter, and thus is likely to hinder the movement of tools through, the insert I.

FIG. 3 shows an alternative embodiment of a flow meter in accordance with the present invention including an insert I having a bore in its central region 3 which is oval in cross-section. Both conduits 11 are shown. They are in fluid communication with the oval bore at its apexes.

First and second pockets 30 and 31 are formed by respective tube portions 32 and 33 and closures 34 and 35. As can be seen from the view in FIG. 3 looking downstream along the insert I, the cross-sections of the tube portions 32 and 33 each form an arc of a circle and are located so as to be co-axial with the insert I. The arcs of the tube portions 32 and 33 correspond to a hypothetical circle having a diameter equal to or slightly greater than that of the inlet 1 and the outlet 5, the bore of which is shown at 36 in FIG. 3. Thus, although the width of the bore of the central bore region 3 between the channels 23 and 24 has not been increased, the width of the bore of the central region has been increased between the conduits 11, that is the bore width is increased in a direction which is not limited by the presence of the channels 23 and 24 in the insert I.

In this way, the pockets 30 and 31 are wider in the sense that the distance between arcs of the tube portions 32 and 33 and opposing regions of the inner surface of the central bore region 3 is increased in comparison to the FIG. 2 embodiment. The pockets 30 and 31 thus formed extend over more of the fluid path in the central bore region 3 and can thus be described as wider than the pocket 10 of the FIG. 2 embodiment. The pockets 30 and 31 thus capture fluids which would be flowing at speeds, closer to those found along the central axis of the central bore region 3. As the wider pockets 30 and 31 provide a larger static pressure than would the pocket 10, for a given flow rate this second embodiment allows a more accurate fluid flow measurement to be made by the calculating means 19.

Also, as the pockets 30 and 31 extend only around the two separate outer regions of the bore (they occupy 100° segments of the perimeter of the oval cross-section of the central bore region 3), two other regions of the bore are not occupied by pockets (2×80° segments of its perimeter). The two other regions are at the smallest radius portions of the cross-section adjacent the channels 23, 24. Therefore, this embodiment provides a greater cross-sectional area through which fluid can flow compared to the FIG. 1 embodiment. Since the segments correspond to the apexes of the oval cross-section of the bore in the central bore section 3, the effective diameter of the bore of the insert is not reduced to be less than the diameters of the inlet 1 and the outlet 5.

FIG. 4 shows a third embodiment of a flow meter in accordance with the present invention including an insert I having pockets 40 and 41 which each comprise a 60° segment of the oval cross-section or the central bore region 3. The pockets 40 and 41 are formed by tube portions 42 and 43 and closures 44 and 45.

The pockets 40 and 41, although smaller than the FIG. 3 pockets 30, 31, have the same maximum width between the arcs of the tube segments 42 and 43 and opposing regions of the inner surface of the central bore region 3.

As more of the cross-sectional area of the central bore region 3 is available for fluid to flow through, the flow is improved in comparison to the FIG. 3 flow meter and thus provides a lower pressure drop across its inlet 1 and outlet 5 than the FIG. 3 flow meter.

In a modification to any of the embodiments described above, holes are provided in the bottoms of, i.e. at the downstream end of, the pockets. This increases the maximum flow rate which is measurable by the pressure sensors which necessarily have upper measurement limits. Since some fluid flows through the holes, not all of the dynamic pressure is converted into static pressure. In an oil production well, sand and other abrasive materials in the fluid could enlarge the holes over a period of time. This can be compensated for by making arrangements for the calculating means 19 to include a time variable factor based on prediction of hole enlargement. Alternatively, the calculating means 19 could be programmable from a surface located controller to alter or vary its calculations by an amount dependent on the composition and the amounts and the flow rates of the fluids which have actually passed through the insert I since its installation.

In another embodiment, the calculating means 19 is remote from the insert I and located near the mouth of the borehole or on a platform such as a ship or an oil rig. Here, signals from the transducer 13 travel up the borehole to the calculating means 19. Locating electronics associated with the calculating means 19 outside of the environment of the borehole may provide improved reliability of the flow meter.

Furthermore, instead of detecting a pressure differential between the first and second positions with a differential pressure measurement transducer, separate transducers can be used which measure separate pressures at respective ones of the first and second positions. A subtraction operation on the pressures provides a pressure differential.

Although in the foregoing the pockets have been described as being of tubular or arc configurations which are aligned to co-axially with the longitudinal axis of the insert, the present invention is not so limited. For example, a pocket which tapers from a large cross-sectional area at its open, upstream, end to a smaller cross-sectional area at its opposite, downstream, end may be provided. Such a pocket need not be closed off at its downstream end thereby forming what can be described as a narrow necked funnel. Alternatively, a pocket may be formed by a tube or the like which has one end sealed against the inner surface of the insert and extends upstream, either axially or otherwise, and having a free open end such that its mouth is not in contact at all with the inner surface of the insert. The main requirements of the pocket are that it captures fluid flowing through the insert I and that it provides a region of fluid in the pocket from which worthwhile pressure measurements can be made.

I claim:

1. A flow meter comprising a duct having an internal perimeter and means for indicating fluid flow in the duct, said indicating means comprising: a pocket open at its upstream end in the duct; and detection means for detecting a pressure differential between a first position inside the pocket, and a second position outside the pocket and deriving from the pressure differential an indication of the fluid flow within the duct, wherein the pocket extends around only a segment of said internal perimeter of the duct.

2. The flow meter in accordance with claim 1, in which the pocket is closed at its downstream end.

3. The flow meter in accordance with claim 1, in which the indication of the fluid flow is a fluid flow rate measurement.

4. The flow meter in accordance with claim 1, in which said duct is provided by a central bore region of the flow meter having a non-circular cross-section.

5. The flow meter in accordance with claim 4, in which the central bore region has an oval cross-section.

6. The flow meter in accordance with claim 5, in which the segment corresponds to an apex of-the oval cross-section.

7. The flow meter in accordance with claim 4, in which an effective diameter of the bore region is no less than an effective diameter of the bore of each an inlet and an outlet of the flow meter.

8. The flow meter in accordance with claim 4, in which the flow meter has first and second flow paths allowing communication of pressure information from respective ones of first and second positions at its inner surface to a measuring position at its outer surface.

9. The flow meter in accordance with claim 8, in which the first flow path extends first substantially radially and then substantially longitudinally.

10. An insert, comprising: a flow meter comprising a duct having an internal perimeter and means for indicating fluid flow in the duct, said indicating means comprising: a pocket open at its upstream end in the duct; and detection means for detecting a pressure differential between a first position inside the pocket, and a second position outside the pocket and deriving from the pressure differential an indication of the fluid flow within the duct, wherein the pocket extends around only a segment of said internal perimeter of the duct.

11. The insert according to claim 10, comprising a section of production tubing.

* * * * *